Patented July 4, 1944

2,352,945

UNITED STATES PATENT OFFICE 2,352,945

DIAZINE DERIVATIVES

Gaetano F. D'Alelio and James W. Underwood, Pittsfield, Mass., assignors to General Electric Company, a corporation of New York No Drawing. Application July 14, 1942,
Serial No. 450,918

16 Claims. (Cl. 260—251)

This invention relates to new chemical compounds and more particularly to diazine derivatives. The invention especially is concerned with the production of new and useful esters of diamino diazinyl thio-monocarboxylic acids.

The chemical compounds of this invention may be represented by the following general formula:

I

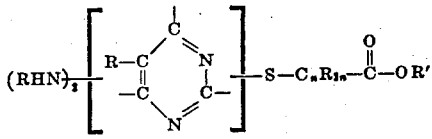

In the above formula $n$ represents an integer and is at least 1 and not more than 2, R represents a member of the class consisting of hydrogen and monovalent hydrocarbon and substituted hydrocarbon radicals, more particularly halohydrocarbon radicals, and R' represents a member of the class consisting of monovalent aliphatic hydrocarbon radicals and monovalent aromatic and nuclearly substituted, specifically halogenated, aromatic hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are: methyl, ethyl, propyl, isopropyl, butyl, secondary butyl, isobutyl, butenyl, amyl, isoamyl, hexyl, octyl, allyl, methallyl, ethallyl, crotyl, cyclopentyl, cyclopentenyl, cyclohexyl, cyclohexenyl, cycloheptyl, benzyl, cinnamyl, phenylethyl, phenylpropyl, phenyl, diphenyl, naphthyl, anthracyl, tolyl, xylyl, ethylphenyl, propylphenyl, isopropylphenyl, allylphenyl, propenylphenyl, 2-butenylphenyl, tertiary-butylphenyl, methylnaphthyl and the like. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I is hydrogen. However, there also may be produced in accordance with the present invention compounds such, for instance, as those represented by the general formulas:

II

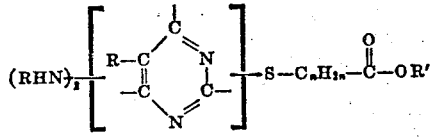

and more particularly,

III

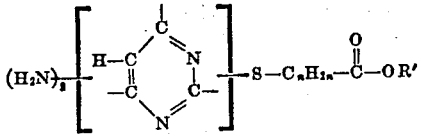

specifically

IV

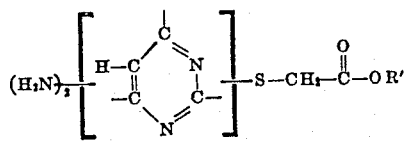

and

V

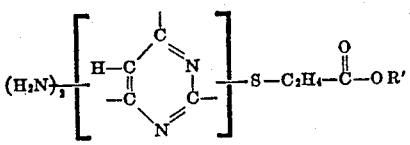

where $n$, R and R' have the same meanings as given above with reference to Formula I.

The new componds of this invention may be used, for example, as pharmaceuticals, plasticizers and as intermediates in the preparation of derivatives thereof such as hydrazo, hydrazino, carbazido, semicarbazido, ureido, amidine, methylol, methylene, etc., derivatives of the individual compound embraced by Formula I. Our new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such reaction products are more fully described and are specifically claimed in our copending application Serial No. 450,916, filed concurrently herewith and assigned to the same assignee as the present invention. These new diazine derivatives also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between a mercapto (monomercapto) diamino

pyrimidine and an ester of a halo monocarboxylic acid corresponding to the general formula VI

where X represents a halogen atom and $n$, R and R' have the same meanings as given above with reference to Formula I.

Illustrative examples of mercapto diamino pyrimidines that may be employed, depending upon the particular end-product sought, are:

2-mercapto 4,6-diamino pyrimidine
4-mercapto 2,6-diamino 5-ethyl pyrimidine
2-mercapto 4,6-diamino 5-methyl pyrimidine
2-mercapto 4-bromotoluido 6-benzylamino pyrimidine
4-mercapto 2,6-diamino pyrimidine
2-toluido 4-mercapto 6-methylamino pyrimidine
2-mercapto 4-phenylchloroethylamino 6-phenethylamino pyrimidine
2-mercapto 4-chloroanilino 6-ethylphenylamino pyrimidine
2-mercapto 4-cycloheptylamino 6-isopropylamino pyrimidine
2-mercapto 4,6-di-(methylamino) pyrimidine
2-mercapto 4,6-di-(fluorophenylamino) pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto 4,6-di-(anilino) pyrimidine
2-mercapto 4,6-di-(anilino) 5-butyl pyrimidine
2-mercapto 4-xenylamino 5-cyclopentyl 6-pentylamino pyrimidine
2-toluido 4-mercapto 5-cyclohexanyl 6-amino pyrimidine
2-mercapto 4-amino 6-ethylamino pyrimidine
2-mercapto 4,6-di-(propylamino) pyrimidine
2-allylamino 4-mercapto 6-chlorophenylamino pyrimidine
2-pentylamino 4-mercapto 5-phenyl 6-amino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-(3'-butenylamino) 6-isopropylamino pyrimidine
2-mercapto 4-isobutylamino 6-cyclopentylamino pyrimidine
2-mercapto 4-isobutylamino 5-propyl 6-cyclopentylamino pyrimidine
2-mercapto 4-amino 6-chloroxenylamino pyrimidine
2-mercapto 4-ethylphenylamino 5-naphthyl 6-xylidino pyrimidine
2-mercapto 4-isopropylanilino 6-benzylamino pyrimidine
2-mercapto 4,6-di-(iodophenylamino) pyrimidine
2-mercapto 4,6-diamino 5-bromotolyl pyrimidine
2-mercapto 4-phenethylamino 5-(2'-butenyl) 6-cyclopentenylamino pyrimidine
2-mercapto 4,6-diamino 5-naphthyl pyrimidine
2-mercapto 4-amino 5-phenylisopropyl 6-chlorocyclohexylamino pyrimidine
2-mercapto 4-isobutylamino 6-bromonaphthylamino pyrimidine Illustrative examples of esters of halo monocarboxylic acids that may be used, depending upon the particular end-product desired, are:

The aliphatic and aromatic halogenoacetates and halogenopropionates
The nuclearly halogenated aromatic halogenoacetates and halogenopropionates More specific examples are:

Methyl chloroacetate
Methyl bromoacetate
Ethyl chloroacetate
Ethyl bromoacetate
Methyl iodoacetate
Ethyl iodoacetate
Propyl chloroacetate
Propyl bromoacetate
Butyl beta-chloropropionate
Isobutyl alpha-chloropropionate
Pentyl alpha-bromopropionate
Hexyl beta-bromopropionate
Allyl alpha-chloropropionate
Propenyl beta-chloropropionate
Cyclopentyl alpha-bromopropionate
Cyclohexyl beta-chloropropionate
Benzyl alpha-methyl beta-chloro propionate
Phenyl alpha-bromo beta-ethyl propionate
Chlorophenyl alpha-propyl beta-iodo propionate
Chloroxenyl alpha-ethyl beta-chloro propionate
Tolyl alpha, alpha-diethyl beta-chloro propionate
Phenyl chloroacetate
Chlorophenyl chloroacetate
Bromotolyl bromoacetate
Iodophenyl iodoacetate
Fluorophenyl chloroacetate
Fluorophenyl bromoacetate
Methyl alpha-chlorophenyl beta-chloro propionate
Methyl alpha,beta-dipropyl alpha-chloro propionate
Xylyl chloroacetate
Methyl alpha,beta-dichloropropionate Various hydrohalide acceptors may be employed. We prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the chosen ester of a halo monocarboxylic acid may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. Instead of alcohol, other solvents may be employed, for instance dioxane. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

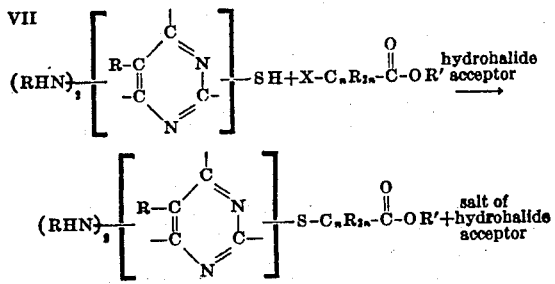

In the above equation X represents a halogen atom and $n$, R and R' have the same meanings as given above with reference to Formula I.

In order that those skilled in the art better may understand how the present invention may be carried into effect, the following illustrative examples are given. All parts are by weight.

*Example 1*

This example illustrates the preparation of ethyl (4,6-diamino pyrimidyl-2 thio) acetate, the formula for which is

VIII $$\text{H}_2\text{N-C} \begin{array}{c} \text{NH}_2 \\ | \\ \text{C} \\ \end{array} \text{N} \quad \text{O}$$
$$\text{H-C} \quad \text{C-S-CH}_2-\text{C-OC}_2\text{H}_5$$

| | Parts |
|---|---|
| 2-mercapto 4,6-diamino pyrimidine | 142.0 |
| Ethyl chloroacetate | 122.5 |
| Sodium hydroxide | 40.0 |
| Water | 500.0 |
| Alcohol | 500.0 |

The above-stated amounts of 2-mercapto 4,6-diamino pyrimidine and sodium hydroxide were dissolved in the mixture of the stated amounts of alcohol and water, yielding a clear solution. The ethyl chloroacetate was added to this solution. The mix was stirred and allowed to react at room temperature of 96 hours, followed by heating under reflux at the boiling temperature of the mass for 1 hour. After cooling, the precipitate comprising ethyl (4,6-diamino pyrimidyl-2 thio) acetate was filtered off, washed and dried. A yield of 194 parts of washed and dried product was obtained. No attempt was made to obtain any more product from the mother liquor.

By using an ester of chloroacetic acid corresponding to the ester-substituted thio pyrimidine desired, other aliphatic (e. g., alkyl, alkenyl), aromatic and nuclearly halogenated (e. g., chlorinated, brominated, fluorinated, etc.) aromatic (4,6-diamino pyrimidyl-2) acetates similarly are prepared.

*Example 2*

The compound, ethyl (2,6-diamino pyrimidyl-4 thio) acetate, is prepared in essentially the same manner as described under Example 1 with the exception that 142 parts of 4-mercapto 2,6-diamino pyrimidine are used in place of 142 parts of 2-mercapto 4,6-diamino pyrimidine.

*Example 3*

The compound, methyl [4,6-di-(methylamino) pyrimidyl-2 thio] acetate, is prepared in essentially the same manner as described under Example 1 with the exception that, instead of ethyl chloroacetate, an equivalent amount of methyl chloroacetate is used and, instead of 2-mercapto 4,6-diamino pyrimidine, an equivalent amount of 2-mercapto 4,6-di-(methylamino) pyrimidine.

*Example 4*

The compound, ethyl alpha-(4,6-diamino pyrimidyl-2 thio) propionate, is prepared in essentially the same manner as described under Example 1 with the exception that, instead of ethyl chloroacetate, an equivalent amount of ethyl alpha-chloropropionate, $CH_3CHClCOOC_2H_5$, is used. The corresponding beta derivative is obtained by using ethyl beta-chloropropionate as a starting reactant in place of ethyl alpha-chloropropionate.

Examples of the chemical compounds of the invention that are embraced by Formula I are listed below:

The aliphatic (e. g., alkyl, alkenyl), aromatic esters of the and nuclearly halogenated aromatic (diamino pyrimidyl thio) substituted acetic and propionic acids Methyl (diamino pyrimidyl thio) acetate
Ethyl (dianilino pyrimidyl thio) acetate
Propyl (diamino pyrimidyl thio) acetate
Butyl (diamino pyrimidyl thio) acetate
Pentyl (diamino pyrimidyl thio) acetate
Hexyl (diamino pyrmidyl thio) acetate
Phenyl (diamino pyrimidyl thio) acetate
Tolyl (diamino pyrimidyl thio) acetate
Xylyl (diamino pyrimidyl thio) actate
Xenyl (diamino pyrimidyl thio) acetate
Methyl [4,6-di-(ethylamino) pyrimidyl-2 thio] acetate
Methyl (2,6-dianilino pyrimidyl-4 thio) acetate, which also may be named methyl (2,4-dianilino pyrimidyl-6 thio) acetate
Ethyl [4,6-di-(isobutylamino) pyrimidyl-2 thio] acetate
Ethyl [4,6-di-(propenylamino) pyrimidyl-2 thio] acetate
Isobutyl [4,6-di-(cyclopentylamino) pyrimidyl-2 thio] acetate
Propenyl [4,6-di-(benzylamino) pyrimidyl-2 thio] acetate
Cyclopentyl [4,6-di-(phenethylamino) pyrimidyl-2 thio] acetate
Chrolotolyl (diamino pyrimidyl thio) acetate
Fluorophenyl (diamino pyrimidyl thio) acetate
The methyl (diamino pyrimidyl thio) chloropropionates
Tolyl [4,6-di-(naphthylamino) pyrimidyl-2 thio] acetate
Xylyl (4,6-ditoluido pyrimidyl-2 thio) acetate
Methyl (4,6-diamino 5-methyl pyrimidyl-2 thio) acetate Ethyl [4,6-di-(methylamino) 5-ethyl pyrimidyl-2 thio] acetate
Phenyl (4,6-diamino 5-methyl pyrimidyl-2 thio) acetate
Benzyl (4,6-diamino 5-phenyl pyrimidyl-2 thio) acetate
Phenethyl (4,6-dianilino 5-methyl pyrimidyl-2 thio) acetate
Propyl (4,6-diamino 5-cyclopentyl pyrimidyl-2 thio) acetate
Methyl alpha-(diamino pyrimidyl thio) propionate
Methyl beta-(diamino pyrimidyl thio) proprionate
Ethyl alpha-(4,6-dianilino pyrimidyl-2 thio) propionate
Ethyl alpha [4,6-di-(methylamino) pyrimidyl-2 thio] propionate
Phenyl alpha-(diamino pyrimidyl thio) propionate
Phenyl beta-(diamino pyrimidyl thio) propionate
Phenyl beta-(4,6-dianilino pyrimidyl-2 thio) propionate
Bromophenyl alpha-(diamino pyrimidyl thio) propionate
Iodophenyl beta-(diamino pyrimidyl thio) propionate
Methyl alpha-(4,6-diamino 5-isobutyl pyrimidyl-2 thio) propionate
Ethyl alpha-(4,6-diamino 5-chlorophenyl pyrimidyl-2 thio) propionate
Octyl beta-(4,6-diamino 5-phenyl pyrimidyl-2 thio) propionate
Tetradecyl (diamino pyrimidyl thio) acetate
Methyl (4-methylamino 6-amino pyrimidyl-2 thio) acetate
Methyl (4-anilino 6-amino pyrimidyl-2 thio) acetate
Phenyl (4-anilino 6-methylamino pyrimidyl-2 thio) acetate
Ethylphenyl (4-methylamino 5-methyl 6-ethylamino pyrimidyl-2 thio) acetate
Allyl (diamino pyrimidyl thio) acetate
Allyl (4-anilino 5-tolyl 6-amino pyrimidyl-2 thio) acetate
Allyl alpha-(diamino pyrimdiyl thio) propionate
Allyl beta-(diamino pyrimidyl thio) propionate
Phenyl alpha-(4-methylamino 5-iodophenyl 6-aminopyrimidyl-2 thio) propionate
Methyl alpha-phenyl beta-(4,6-diamino 5-propenyl pyrimidyl-2 thio) propionate
Methyl alpha-ethyl beta-tolyl alpha-(4,6-diamino pyrimidyl-2 thio) propionate
Phenyl alpha-[2,6-di-(methylamino) pyrimidyl-4 thio] propionate
Methyl [2,6-di-(chloroethylamino) pyrimidyl-4 thio] acetate
Ethyl [2,4-di-(bromoanilino) pyrimidyl-6 thio] acetate It will be understood, of course, by those skilled in the art that, in those compounds listed above that are generically named, the amino (—NHR) groups and the monocarboxylic ester-substituted thio groups may be attached in any arrangement to the symmetrical carbon atoms of the pyrimidine nucleus. In other words, the term "diamino pyrimidyl" includes within its meaning both the 4,6-diamino pyrimidyl-2 and the 2,6-diamino pyrimidyl-4 (2,4-diamino pyrimidyl-6) compounds.

In a manner similar to that described above with particular reference to the diamino [(—NHR)₂] monocarboxylic ester-substituted pyrimidines (1,3- or meta-diazines), corresponding derivatives of the 1,2- or otho-diazines (pyridazines) and of the 1,4- or para-diazines (pyrazines) may be prepared. It also will be understood by those skilled in the art from the foregoing description of the preparation of a monothio diazine derivative that similar compounds may be prepared in which two or three sulfur atoms are attached directly to a carbon atom of the diazine nucleus and which have attached to each sulfur atom a —C$_n$R$_{2n}$—COOR' grouping, where $n$, R and R' have the same meanings as given above with reference to Formula I.

What we claim as new and desire to secure by Letters Patent of the United States is:

1. Chemical compounds corresponding to the general formula

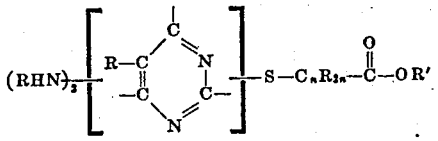

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. Chemical compounds as in claim 1 wherein R represents a hydrogen atom.

3. Chemical compounds as in claim 1 wherein R represents a hydrogen atom and R' represents a monovalent aliphatic hydrocarbon radical.

4. Chemical compounds as in claim 1 wherein R represents a hydrogen atom and R' represents a monovalent aromatic hydrocarbon radical.

5. Chemical compounds as in claim 1 wherein R represents a hydrogen atom and R' represents a monovalent, nuclearly halogenated aromatic hydrocarbon radical.

6. Chemical compounds corresponding to the general formula

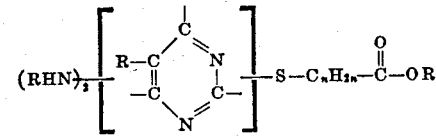

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

7. Chemical compounds corresponding to the general formula

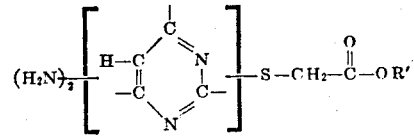

where R' represents a member of the class consisting of monovalent aliphatic hydrocarbon radicals and monovalent aromatic and nuclearly halogenated aromatic hydrocarbon radicals.

8. An aliphatic ester of a (diamino pyrimidyl thio) substituted acetic acid.

9. An alkyl (diamino pyrimidyl thio) acetate.

10. Ethyl (4,6-diamino pyrimidyl-2 thio) acetate.

11. An aromatic ester of a (diamino pyrimidyl thio) substituted acetic acid.

12. A phenyl (diamino pyrimidyl thio) acetate.

13. A nuclearly halogenated aromatic ester of a (diamino pyrimidyl thio) substituted acetic acid.

14. The method of preparing chemical compounds corresponding to the general formula

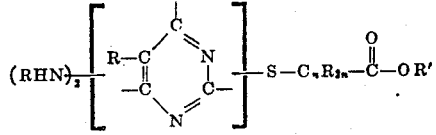

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals, said method comprising effecting reaction, in the presence of a hydrohalide acceptor, between (1) a mercapto diazine corresponding to the general formula

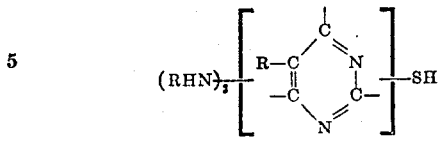

where R has the meaning above given, and (2) an ester of a halo monocarboxylic acid corresponding to the general formula

where X represents a halogen atom and $n$, R and R' have the meaning above given.

15. A method as in claim 14 wherein the hydrohalide acceptor is an alkali-metal hydroxide.

16. The method of preparing ethyl (4,6-diamino pyrimidyl-2 thio) acetate which comprises effecting reaction, in the presence of an alkali-metal hydroxide, between 2-mercapto 4,6-diamino pyrimidine and ethyl chloroacetate.

GAETANO F. D'ALELIO.
JAMES W. UNDERWOOD.

CERTIFICATE OF CORRECTION.

Patent No. 2,352,945. July 4, 1944.

GAETANO F. D'ALELIO, ET AL.

It is hereby certified that error appears in the printed specification of the above numbered patent requiring correction as follows: Page 1, first column, line 18-19, for "halohydrocarbon" read --halo-hydrocarbon--; line 48, for "aromatichydrocarbon" read --aromatic hydrocarbon--; and second column, line 47, for "componds" read --compounds--; page 2, first column, line 59, for "cyclohexanyl" read --cyclohexenyl--; and second column, line 14-15, for "chlorocyclclohexylamino" read --chlorocyclohexylamino--; line 23, for "halogenoproprionates" read --halogenopropionates--; page 3, first column, line 64, for "of 96" read --for 96--; and second column, lines 38 and 39, for "aromatic esters of the and nuclearly halogenated aromatic" read --aromatic and nuclearly halogenated aromatic esters of the--; line 47, for "pyrmidyl" read --pyrimidyl--; line 50, for "actate" read --acetate--; line 67, for "Chrolotolyl" read --Chlorotolyl--; page 4, first column, line 13-14, for "proprionate" read --propionate--; line 17, after "alpha" insert a hyphen; line 47, for "pyrimdiyl" read --pyrimidyl--; line 50, for "aminopyrimidyl" read --amino pyrimidyl--; and second column, line 2, for "otho-diazines" read --ortho-diazines--; page 5, second column, line 16, for "meaning" read --meanings--; and that the said Letters Patent should be read with this correction therein that the same may conform to the record of the case in the Patent Office.

Signed and sealed this 12th day of September, A. D. 1944.

Leslie Frazer (Seal) Acting Commissioner of Patents.